United States Patent [19]

Carter et al.

[11] 4,245,700

[45] Jan. 20, 1981

[54] ENHANCED OIL RECOVERY METHOD

[75] Inventors: Walter H. Carter; Cedric A. Nix, both of Houston, Tex.

[73] Assignee: Texaco Inc., White Plains, N.Y.

[21] Appl. No.: 37,570

[22] Filed: May 9, 1979

[51] Int. Cl.$^3$ .............................................. E21B 43/22
[52] U.S. Cl. .................................... 166/273; 166/274; 166/275; 252/8.55 D
[58] Field of Search ............... 166/273, 274, 275, 246, 166/305 R; 252/8.55 D

[56] References Cited

U.S. PATENT DOCUMENTS

| 3,141,818 | 7/1964 | Stephens et al. | 252/8.55 D X |
|---|---|---|---|
| 3,160,205 | 12/1964 | Harvey et al. | 252/8.55 D X |
| 3,206,398 | 9/1965 | Marlowe et al. | 252/8.55 D |
| 3,329,610 | 7/1967 | Kreuz et al. | 166/275 |
| 3,415,936 | 12/1968 | Hitzman | 252/8.55 D X |
| 3,482,631 | 12/1969 | Jones | 166/275 X |
| 3,605,893 | 9/1971 | Dauben | 166/273 |
| 3,854,532 | 12/1974 | Braden, Jr. | 166/273 X |
| 3,868,999 | 3/1975 | Christopher, Jr. et al. | 166/305 R X |
| 3,956,145 | 5/1976 | Christopher, Jr. et al. | 166/275 X |
| 4,046,196 | 9/1977 | Brown et al. | 166/273 |

*Primary Examiner*—Stephen J. Novosad
*Assistant Examiner*—George A. Suchfield
*Attorney, Agent, or Firm*—Carl G. Ries; Robert A. Kulason; Jack H. Park

[57] ABSTRACT

The oil recovery effectiveness of an enhanced oil recovery method comprising sequentially injecting into a subterranean formation, an aqueous, surfactant-containing fluid followed by an aqueous, hydrophilic, viscosity-increasing polymer-containing fluid, is improved by incorporating from 10 to 500 parts per million of an aromatic compound such as toluene in the aqueous polymer-containing fluid.

10 Claims, No Drawings

ENHANCED OIL RECOVERY METHOD

FIELD OF THE INVENTION

This invention concerns an improved enhanced oil recovery method of the type wherein a surfactant fluid is first injected into a formation and thereafter a polymer-containing fluid is injected into the formation. More specifically, this invention concerns an improvement in an enhanced oil recovery method in which the oil recovery effectiveness is increased substantially by incorporating an additive in a polymer-containing fluid injected subsequent to the injection of a surfactant-containing fluid.

BACKGROUND OF THE INVENTION

When petroleum is found in subterranean formations or reservoirs, the first recovery stage, usually referred to as primary production, merely involves pumping or permitting the petroleum to flow to the surface of the earth through wells drilled into and in fluid communication with the subterranean reservoir. Primary production of petroleum is possible from the subterranean formations only if certain conditions exist. There must be an adequate concentration of petroleum in the formation, and there must be sufficient permeability or interconnected flow channels throughout the formation to permit the flow of fluids therethrough if sufficient pressure is applied to the fluid. Primary production of oil ordinarily employs natural energy existing in the petroleum containing formation, usually in the form of an active, underlying or edge-waterdrive, solution gas, or a high pressure gas cap existing above the petroleum within the reservoir. When the naturally occurring energy source is depleted, or in the instance of those formations which do not originally contain adequate natural energy to permit a primary recovery phase, some form of supplemental recovery or enhanced recovery process must be applied to the reservoir. Supplemental or enhanced recovery is frequently referred to as secondary or tertiary recovery, although in fact it may be primary, secondary or tertiary in sequence of employment. The injection of water into the formation to displace petroleum toward a spaced-apart production well from which it can be recovered to the surface of the earth, which is commonly referred to as waterflooding or secondary recovery, is the most economical and widely practiced form of supplemental recovery. Waterflooding is not an efficient oil recovery technique, however, since water and oil are immiscible and the interfacial tension between water and oil is quite high. This fact has been recognized in the literature pertaining to oil recovery, and many literature references describe the use of interfacial tension-reducing chemicals in the flood water injected in the formation, which results in displacing oil from flow channels not effected by passage of water alone. Organic sulfonates such as petroleum sulfonate are the most commonly described surfactant, although many references describe the use of more complex synthetic surfactants, including nonionic ethoxylated alkanols or alkylphenols, and sulfated or sulfonated, and ethoxylated alkanols or alkylphenols.

While the above described interfacial tension reducing chemicals, more commonly referred to as surfactants, reduce the interfacial tension between the displacing phase and the displaced phase, and therefore accomplish greater recovery from the portion of the formation through which the fluids pass than is possible using water alone, another problem which exists in any oil recovery method employing a displacement of petroleum by an injected fluid is concerned with poor vertical and horizontal conformance, or low volumetric efficiency of the displacement process. It is recognized that the mobility ratio between the injected fluid and displaced fluids is a major factor affecting the volumetric efficiency of a displacement process, and it is well recognized in the art that the incorporation of a viscosifying amount of a hydrophilic polymer such as polyacrylamide, partially hydrolyzed polyacrylamide, copolymers of acrylamide and acrylic acid, as well as biopolymers such as polysaccharides, in the fluid injected subsequent to injection of the surfactant containing fluid, improves the displacement efficiency of the oil recovery process.

Even employing the above-described fluids, enhanced oil recovery processes have usually not been entirely satisfactory under field operating conditions, principally because the amount of oil recovered is insufficient to justify the cost of the chemicals injected into the reservoir. The cause of the low recovery is complex and possibly related to many factors, but one cause is an adverse interaction which occurs between the surfactant fluid and the polymer fluid injected immediately thereafter. Whatever the cause, the technical and/or commercial failure of enhanced oil recovery processes making use of surfactant fluids and polymer fluids is well documented in the literature, and it can be appreciated that there is a substantial need for a cost-effective method for increasing the amount of oil recoverable by such processes.

It is an object of the present invention to provide an improved oil recovery method comprising injecting a slug of surfactant fluid followed by a slug of a polymer-containing fluid, by incorporating an additive in the polymer-containing fluid.

SUMMARY OF THE INVENTION

We have discovered that the incorporation of a small amount, e.g., 10 to 500 parts per million, of an aromatic treating compound having the following formula:

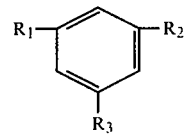

wherein $R_1$, $R_2$, and $R_3$ are each hydrogen, methyl, or $C_2$–$C_9$ and preferably $C_2$–$C_5$ alkyl, in the polymer solution, accomplishes a substantial increase in the amount of oil recovered by the enhanced oil recovery method. The especially preferred species of this invention include benzene, toluene, xylene, and mixtures thereof.

DESCRIPTION OF THE PREFERRED EMBODIMENTS

The present invention constitutes an improvement in an enhanced oil recovery method of the general type in which an aqueous, surfactant-containing fluid is injected into the formation, and thereafter an aqueous, hydrophilic polymer-containing fluid is injected for the purpose of increasing the mobility ratio between the injected fluids and the fluids to be injected thereafter. Finally, water or brine is injected as a drive fluid to displace the surfactant and polymer fluids through the formation, as well as the oil bank formed in the formation as a consequence of passage of the surfactant fluid therethrough.

The surfactants employed in this process may be any one or a combination of surfactants described generally in the literature as being useful for surfactant oil recovery methods. Organic sulfonates, particularly petroleum sulfonates are especially preferred surfactants, and may be used as substantially the only surfactant present in the surfactant fluid if the formation water salinity is sufficiently low that salinity-sensitive surfactants may be employed. Ordinarily, petroleum sulfonates are only suitable for application to formations containing water whose salinity is less than about 20,000 parts per million total dissolved solids. Whether the petroleum sulfonates are used alone in low salinity environment described above, or where they are employed in combination with more soluble, solubilizing cosurfactants as are described below, the preferred petroleum sulfonates for use in this process are those being comprised of species of varying equivalent weights covering a fairly broad range and having an average equivalent weight from about 350 to about 450. Alkyl or alkylaryl sulfonates may also be used, particularly those having from about 6 to 20 and preferably 8 to 18 carbon atoms in the alkyl chain. All of the organic sulfonates described above are ordinarily water soluble sodium, potassium, lithium or ammonium salts.

The concentration of organic sulfonates such as those described is usually from 0.1 to 10.0 and preferably from 1.0 to 5.0 percent by weight.

In application to formations containing water whose salinity exceeds about 20,000 parts per million, other types of surfactants must be used either alone or in combination with the above described organic sulfonates. High-salinity water-containing formations whose temperatures are below about 130° F. permit use of nonionic surfactants, alone or in combination with organic sulfonate. Examples of suitable nonionic surfactants include polyethoxylated alkanols or polyethoxylated alkyphenols, having from 5 to 20 and preferably 8 to 16 carbon atoms in the alkyl chain, and from 4 to 20 and preferably 6 to 16 ethoxy groups. Other nonionic surfactants include dipolyethoxylated amines, and dipolyethoxylated alkyl catacols.

When the formation salinity is quite high and the temperature is moderate, e.g., from 130° F. to 160° F., a preferred class of surfactants are the alkypolyethoxy sulfates or alkyarylpolyethoxy sulfates, having from 6 to 18 and preferably 8 to 14 carbon atoms in the alkyl chain, and containing from 2 to 18 and preferably 2 to 8 ethoxy units.

For high temperature, high salinity formations, e.g., formations containing water whose salinity is as high as 24,000 parts per million total dissolved solids, and formation temperatures in the range from 170° F. to 240° F., the preferred surfactant for use in our process is an alkylpolyalkoxyalkylene sulfonate or alkyarylpolyalkoxyalkylene sulfonate having the following formula:

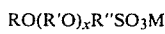

$$RO(R'O)_xR''SO_3M$$

wherein R is an alkyl, linear or branched, having from 6 to 24 and preferably from 12 to 20 carbon atoms, or an alkylaryl such as benzene or toluene having attached thereto at least one alkyl group, linear or branched, and containing from 6 to 20 and preferably from 6 to 16 carbon atoms, R' is ethylene or a mixture of ethylene and higher alkylene such as propylene with relatively more ethylene than higher alkylene, x is a number including fractional numbers from 2 to 18 and preferably from 2 to 8, R" is ethylene, propylene, hydroxypropylene, or butylene, and M is a monovalent cation, preferably sodium, potassium, lithium, or ammonium.

Any of the foregoing-described nonionic surfactants, as well as the sulfated or sulfonated and ethoxylated surfactants, may be used as the only surfactant present in the surfactant fluid, or may be used in combination with the previously described organic sulfonates. In either event, the concentration of these salinity-tolerant surfactants is from 0.10 to 10.0 and preferably from 0.5 to 3.0 percent by weight. When a combination of surfactants is employed, the ratio of the primary anionic organic sulfonate to the solublizing co-surfactant is in the range from about 0.1 to 10.0 and preferably from 0.2 to 3.0.

The total pore volume of surfactant fluid employed in the process of this invention is about the same as is commonly used in state-of-the-art surfactant waterflooding oil recovery methods, which is generally in the range of 0.1 to 2.0 and preferably from 0.2 to 0.5 pore volumes based on the pore volume of formation in the recovery zone defined by the injection wells and production wells penetrating the formation.

In addition to the above described surfactant fluid, a viscous, polymer-containing fluid is injected into the formation in the process for which our invention represents an improvement. The polymer fluid is ordinarily injected immediately following the surfactant fluid, or the polymer may be incorporated in the surfactant fluid. The polymer-containing fluid contains sufficient concentration of hydrophilic polymer to increase its viscosity sufficiently that the overall mobility ratio between the two fluids is positive, i.e. the surfactant fluid is more mobile than the polymer-containing fluid, so viscous fingering is avoided and the volumetric efficiency of the displacement process is maintained at a maximum level. Numerous polymers are described in the literature and commerically available for the purpose of formulating the mobility buffer fluid, including polyacrylamide, partially hydrolyzed polyacrylamide and copolymers of acrylamide and acrylic acid. Examples of commercial products within this group of polymers include Pusher ® sold by Dow Chemical Co., as well as Cyanatrol ® sold by American Cynamide. Another class of polymers suitable for use in the process of our invention is a polysaccharide, such as the biopolymers produced by biological action. Examples of commercially available biopolymers include Xanflood ® sold by Kelco Co. and Polytran ® sold by Pilsbury. Naturally occurring polymers, particularly guar gum, cellulose, starch, and their derivatives may also be used. Mixtures of any of these polymers may also be used. The concentration of polymer in the above described polymer fluid is ordinarily sufficient to produce the desired mobility ratio, which is best determined by a laboratory test. Within this guideline, the concentration is generally in the range of from about 200 to about 4,000 parts per million and preferably from about 500 to about 2,000 parts per million.

The salinity of the surfactant fluid may be quite low, e.g., fresh water, or in the range of from 50 to 100 percent of the salinity of the water present in the formation, in those processes where the surfactant is selected and- /or blended to accomplish low interfacial tension displacement of oil in high salinity environments.

The improvement which comprises our invention involves incorporating in the fluid which contains the polymer, from 10 to 500 and preferably from 50 to 500 parts per million of an aromatic treating compound having the following formula:

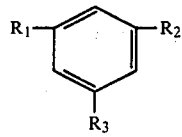

wherein $R_1$, $R_2$, and $R_3$ are each hydrogen, methyl, or a $C_2$ to $C_9$ and preferably a $C_2$ to $C_5$ alkyl, with the total number of carbon atoms in $R_1$, $R_2$ and $R_3$ being from 0 to 9. The preferred species are benzene, toluene, and xylene, with toluene being the especially preferred species.

In commonly owned, co-pending application Ser. No. 37,587, filed May 9, 1979 for Improved Polymer-Containing Fluid and an Oil Recovery Method Using the Fluid, there is disclosed a method for stabilizing the polymer solution against microbial attack by treating the fluid with from 500 to 2000 parts per million toluene or other materials similar to those disclosed above. Test data indicates, however, that microbial stabilization does not occur in certain polymer fluids when the concentration of aromatic treating agent is below 500 parts per million. We have discovered, however, that an improvement in oil recovery effectiveness is achieved even when the polymer fluid contains from 10 to 500 parts per million and preferably from contains from 10 to 500 parts per million and preferably from 100 to 500 parts per million toluene or other aromatic treating compound, as will be discussed more fully below. The improvement in oil recovery is also achieved by incorporating the aromatic treating agent in the polymer fluid at higher concentrations than 500 parts per million. One embodiment of our invention is, therefore, an oil recovery method comprising injecting into a formation, an aqueous fluid containing at least one surfactant, at least one hydrophilic polymer, and from 10 to 500 parts per million aromatic treating compound as described above.

FIELD EXAMPLE

For the purpose of illustrating a preferred mode of operating according to the process of this invention, the following pilot field example is disclosed. This is not intended to be in any way limitative or restrictive of the scope of this invention, however; rather it is offered only for the purpose of providing a complete disclosure including a best mode of operating according to this process.

A subterranean, petroleum-containing formation having a porosity of 25 percent and a permeability of 300 millidarcies, has been exploited by primary production and secondary recovery, i.e., conventional waterflooding. At the conclusion of waterflooding, the oil saturation remaining in the formation is about 45 percent. The salinity of the water present in the formation at the time waterflooding operations must be terminated is about 85,000 parts per total dissolved solids including 6,500 parts per million divalent ions, principally calcium. The temperature of the formation is 145° F. (62.8° C.). Because of the high salinity and moderately high temperature of the formation, the preferred surfactant is identified as being a one-to-one mixture of sodium salt of petroleum sulfonate having an average equivalent weight of 390 and nonylbenzenetriethoxy sulfate. This mixture of surfactants is utilized in the total concentration of 2.5 percent and the surfactant fluid salinity is 70,000 parts per million total dissolved solid. This fluid is followed by a viscous aqueous fluid containing 1100 parts per million of partially hydrolyzed polyacrylamide polymer plus 250 parts per million toluene.

The pilot experiment is conducted in a single pattern comprising a square 100 feet on a side, with a production well at each corner of the square and an injection well in the center thereof. Since the formation thickness is 42 feet and the volumetric efficiency of a simple five-spot pattern such as is employed in this example is 70 percent, the pore volume of the recovery zone defined by these five wells is:

$$100 \times 100 \times 42 \times 0.25 \times 0.7 = 73,500 \text{ cubic feet.}$$

One pore volume is approximately 550,000 gallons. The volume of surfactant fluid employed is 30 percent pore volume or 165,000 gallons. The volume of polymer fluid employed is 20 pore volume percent, or 110,000 gallons. After the injection of all the surfactant and polymer fluid, field brine having a salinity of 40,000 parts per million total dissolved solids is injected into the injection well to displace oil and all of the injected fluids through the formation toward the production well. The average residual oil saturation in the formation at the conclusion of this field trial is 11 percent. No adverse interaction between the surfactant and polymer is experienced.

EXPERIMENTAL SECTION

For the purpose of further illustrating and disclosing the novel process of this invention, and further to illustrate how the invention can be applied to particular laboratory environments and to illustrate the magnitude of results achieved from application thereof, the following experimental work was performed and the observed results are given below.

A series of core floods were performed the enhanced oil recovery potential of a surfactant flood followed by apolymer flood in which one run was performed without toluene in the polymer fluid and a comparative run was performed using 100 gm/m³ toluene. The runs were otherwise identical, and the following comments apply to both runs.

The core floods were performed in a Berea core, which was first water saturated, then oil saturated, then waterflooded to a constant oil saturation, and then subjected to chemical flooding, i.e., injection of a slug of surfactant fluid followed by a slug of polymer fluid. Floods were performed at 109° F. at a flow rate of 0.5 cm³/min. The waterflood was conducted with a field brine having a salinity of about 80,000 parts per million total dissolved solids. In each case, 0.2 pore volumes of surfactant solution was injected into the core, the surfactants contained in the surfactant solution comprised 1.07 weight percent Witco TRS18 ®, and 2.45 percent Witco TRS40 ®, both of which are petroleum sulfonates, and 1.48 percent nonylbenzenehexaethoxyethelene sulfonate. This was followed by 2.0 pore volumes of polymer fluid comprising 1000 gm/m³ Xanflood ® in fresh water. In run A, no toluene was included in the polymer solution, whereas in run B, the polymer fluid also contained 100 gm/m³ toluene. The comparison run, employing surfactant and polymer without toluene, recovered 62 percent of the oil remaining in the core after waterflooding. By comparison, run B, which was otherwise identical to run A except for the presence of 100 parts per million toluene in the polymer solution, recovered 72 percent of the tertiary oil. This means the presence of only 100 parts per million toluene in the polymer fluid caused recovery of 16 percent more of the oil remaining in the core after waterflooding.

CONCLUSION

It can be seen from the foregoing that 100 parts per million toluene in the polymer fluid injected after surfactant flooding, which concentration level is inadequate to prevent bacterial degradation of the polymer fluid, nevertheless, produce a significant increase in the tertiary oil recovery effectiveness of a surfactant and polymer flood.

While our invention has been described in terms of a number of illustrated embodiments, it is not so limited since many variations thereof will be apparent to persons skilled in the art of enhanced oil recovery without departing from the true spirit and scope of our invention. It is our intention that our invention be limited and restricted only by those limitations and restrictions appearing in the Claims appended hereinafter below.

We claim:

1. In a method of recovering petroleum from a subterreanean, petroleum-containing formation, penetrated by at least one injection well and by at least one production well, both wells being in fluid communication with at least a portion of the formation, comprising injecting an aqueous, surfactant-containing liquid into the formation, followed by injecting an aqueous, hydrophilic, viscosity increasing polymer-containing liquid, and thereafter injecting a drive liquid into the formation to displace petroleum and the previously-injected liquids through the formation toward a production well from which it is recovered to the surface of the earth, wherein the improvement for increasing the amount of petroleum recovered by the enhanced oil recovery process comprises:

incorporating from 10 to 500 parts per million of an aromatic treating compound in at least a portion of the polymer-containing liquid, the aromatic treating compound having the following formula:

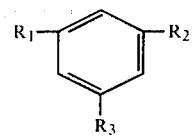

wherein $R_1$, $R_2$, and $R_3$ are each hydrogen, methyl, or a $C_2$ to $C_9$ alkyl, the total number of carbon atoms in $R_1$, $R_2$ and $R_3$ being from 0 to 9.

2. A method as recited in claim 1 wherein $R_1$, $R_2$, and $R_3$ are each hydrogen, methyl, or a $C_2$ to $C_5$ alkyl.

3. A method as recited in claim 1 wherein the aromatic treated compound is benzene, toluene, or xylene.

4. A method as recited in claim 3 wherein the aromatic treating compound is toluene.

5. A method as recited in claim 1 wherein the concentration of aromatic treating compound in the polymer-containing fluid is from 50 to 500 parts per million.

6. A method as recited in claim 1 wherein the polymer is selected from the group consisting of polyacrylamide, partially hydrolyzed polyacrylamide, copolymers of acrylamide and acrylic acid, biopolymers including polysaccharide, naturally occurring polymers, and mixtures therefof.

7. A method for recovering oil from a subterranean, petroleum-containing, permeable formation penetrated by at least one injection well and by at least one production well, comprising injecting into the formation via the injection well, an aqueous fluid containing a surfactant, a hydrophilic polymer, and from 10 to 500 parts per million of an aromatic compound having the following formula:

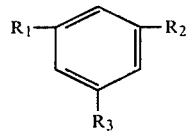

wherein $R_1$, $R_2$, and $R_3$ are each hydrogen, methyl or a $C_2$ to $C_9$ alkyl, the total number of carbon atoms in $R_1$, $R_2$ and $R_3$ being from 0 to 9.

8. A method as recited in claim 7 wherein $R_1$, $R_2$, and $R_3$ are each hydrogen, methyl or a $C_2$ to $C_5$ alkyl.

9. A method as recited in claim 7 wherein the aromatic compound is benzene, toluene or xylene.

10. A method as recited in claim 7 wherein the concentration of the aromatic compound is from 50 to 500 parts per million.

* * * * *